May 8, 1923.
E. H. STROUD
1,454,492
DUST COLLECTING AND SEPARATING SYSTEM AND APPARATUS
Filed June 16, 1919
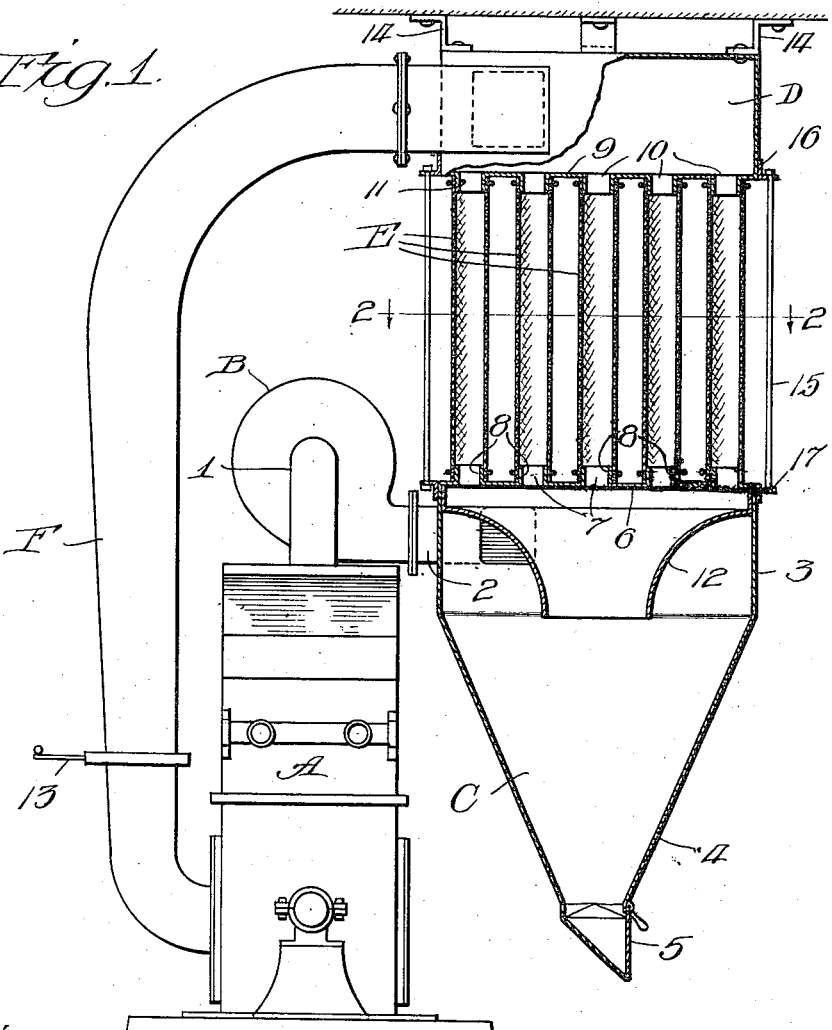
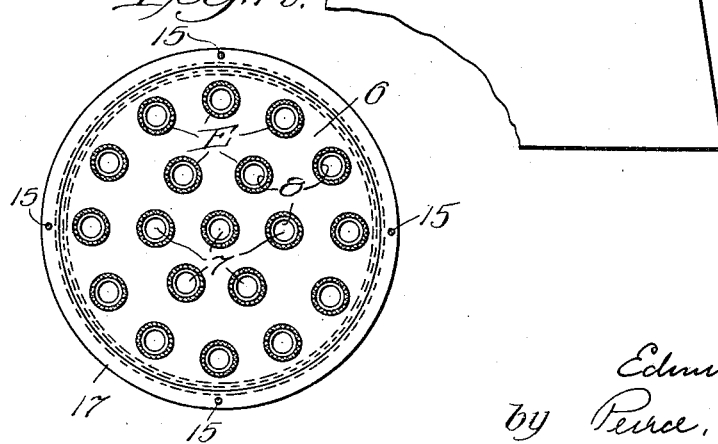
Inventor
Edmund H. Stroud
by Pierce, Fisher & Clapp
Attys Patented May 3, 1923.

1,454,492

UNITED STATES PATENT OFFICE.

EDMUND H. STROUD, OF CHICAGO, ILLINOIS.

DUST COLLECTING AND SEPARATING SYSTEM AND APPARATUS.

Application filed June 16, 1919. Serial No. 304,447.

*To all whom it may concern:*

Be it known that I, EDMUND H. STROUD, a citizen of the United States, and a resident of Chicago, county of Cook, and State of Illinois, have invented certain new and useful Improvements in Dust Collecting and Separating Systems and Apparatus, of which the following is a specification.

The invention relates to systems and apparatus for collecting and separating dust, powder or material consisting of small particles, from a stream of air or the like, and seeks to provide, in connection with a primary centrifugal dust collector or settling chamber, improved means for filtering the air passing therefrom to remove the fine residual material and to provide improved means for relieving the pressure within the filtering means and in the primary collector.

The invention consists in the features of improvement hereinafter set forth, illustrated in the preferred form in the accompanying drawings and more particularly pointed out in the appended claims.

In the drawings the improved system and apparatus is illustrated in connection with a pulverizer or other machine or unit having a fan, blower or the like, which supplies a stream of air laden with powdered material. Figure 1 is a view partially in vertical section and partially in elevation of the improved system. Figure 2 is a horizontal section on the line 2—2 of Fig. 1.

In the drawings, A indicates a pulverizer of any suitable construction and which may be used, for example, for supplying finely powdered coal. The pulverizer is provided at its upper end with a fan B through which the powdered material is delivered, the fan casing being connected to the casing of the pulverizer by an inlet pipe 1. Air is supplied in the well-known manner to the pulverizer casing through the usual air inlet (not shown) and passes, together with the powdered material, through the pipe 1 into the fan casing. The discharge pipe 2 leading from the fan terminates in a tangentially arranged inlet for a centrifugal dust collector C and which leads into the upper portion thereof in the usual manner. Like the ordinary or so-called "Cyclone" dust collector, the separating chamber or collector B comprises an upper cylindrical portion 3 and a lower conical portion 4. The lower conical portion is provided with an outlet for material at its lower end, which is preferably provided with a hinged cover 5 or other suitable means for permitting the discharge of material but guarding against the entrance of any considerable amount of air.

Instead of a single large axial air outlet, the centrifugal separating chamber or collector C is provided with a large number of relatively small air outlets. For this purpose, its upper wall 6 is in the form of a flue sheet having a plurality of openings 7 therein surrounded by upwardly projecting flanges 8.

Located at some distance above the collector C is an air chamber D which is in the form of a short cylinder of substantially the same diameter as the upper portion of the collecting chamber C. The bottom wall 9 of this air chamber, like the upper wall of the main collecting chamber, is a flue sheet having a corresponding series of openings 10 therein and which are provided with downturned rims or flanges 11. A series of vertically disposed cloth filter tubes E are interposed between the dust collector C and the air chamber D, the ends of the tubes being secured to the flanges 8 and 11 by wire ties or other suitable means. Instead of a cylindrical guard, such as is usually provided in the upper portion of the centrifugal dust collector, the separating chamber of collector C is provided with a tubular flaring guard 12 of inverted bell-shape, the wall of which is curved both circumferentially and longitudinally. This guard is concentrically disposed within the upper cylindrical portion of the collector C and is attached to the vertical wall of the cylindrical portion 3 at a point adjacent but spaced from the perforated top 6 and, in the form shown, substantially coincident with the upper edge of the tangential air inlet 2. From this point of attachment the curved wall of the guard extends first inwardly and then downwardly to a depth corresponding substantially to the depth of the cylindrical portion 3 and its lower end has a circular, axially-disposed opening that is preferably slightly larger than one-third of the diameter of the cylindrical portion 3. For different purposes, the depth of the curved walls of the guard can be varied but the inverted bell-shape should be preserved and it should extend from a point coincident or slightly above the tangential air inlet to a point below the same and it should not extend to any substantial extent into the conical portion 4 of the separator. This arrangement provides ample space within the upper cylindrical portion 3 for the expansion of the air entering the separating chamber through the tangential air inlet, it does not interfere with the proper swirling action of the air within the lower conical portion and it provides for the proper delivery of the air passing from the chamber to all of the fabric filtering tubes E.

In ordinary operation, the greater bulk of material is separated in the centrifugal collecting chamber C, and the air passes from the main portion of this chamber up through the opening in the lower end of the guard 12 and thence through the air outlets 7 and fabric filtering tubes E. The latter filter the fine residual dust remaining in the air and return it through the openings 7 into the main collecting chamber. The guard 12 protects the air outlets 7 and compels the precipitation of the greater bulk of material in the chamber C before the air passes through the outlets. It also provides a slanting deflecting surface over which material precipitated thereon from the tubes passes back into the main body of material in the lower portion of the separating chamber C.

The air filtering tubes E are proportioned and designed to permit the escape of practically all the air passing, under ordinary conditions, from the pulverizer, fan or other unit which supplies the stream of dust-laden air. But frequently additional air must be passed through and from the supply unit and provision must be made whereby the air filtering means is relieved of this excess air. In the present construction, by reason of the peculiar arrangement of the vertically disposed filtering tubes leading upwardly from the main separating chamber, this excess air can be drawn directly from the upper air chamber D, and for this purpose the chamber is connected by a relief pipe F to the casing of the pulverizer, fan or other supply unit. The relief pipe extends tangentially from the side wall of the cylindrical chamber D and, at a point adjacent the pulverizer, is provided with a sliding damper or other like valve 13 by which the amount of excess air drawn from the chamber D into the pulverizer or other supply unit is controlled.

Under ordinary conditions the valve 13 is closed and practically all the air drawn from the pulverizer by the fan and forced into the separating chamber C escapes through the filter tubes E. If occasion arises for it, an additional amount of air may be furnished to the supply unit by partially opening the valve or damper 13. It thus not only supplies additional air but also relieves the fabric filter of excessive pressure and prevents a back pressure upon the pulverizer, fan or other supply unit. Under such a condition a small quantity of material may be returned through the relief pipe to the pulverizer, but it avoids retarding the operation of the apparatus and there will be no substantial decrease in the output under circumstances requiring an excess of air. Also, if required either before or after an operation, the valve 13 may be opened wide and the fan B driven at a very high speed so that an unusual rush of air can be maintained through the cloth filter tubes to effectively cleanse them from dust or powder adhering to their inner surfaces. The arrangement of course prevents loss of the material passing through the relief pipe F from the cloth filter.

The collector C and the chamber D may be supported in any suitable manner. For example, in the form shown, the upper cylinder D is carried from the ceiling by means of hanger brackets 14 and the collecting chamber C is supported from the cylinder D by rods 15 which extend between angle bars 16 and 17 surrounding the upper and lower ends respectively of the chambers C and D.

Obviously, changes may be made in the details set forth without departure from the essentials of the invention as defined by the claims.

I claim as my invention:

1. In a dust collecting and separating system, the combination of a unit for supplying a stream of air laden with dust or powdered material, of a collecting chamber for receiving the air from said unit and separating the bulk of the material therefrom, fabric filtering means communicating at one end with said chamber to receive and filter the residual material from the air passing from said chamber, and means for relieving the internal pressure on said fabric filtering means comprising a relief pipe communicating with the opposite end of said filtering means and with said supply unit and an adjustable valve for cutting off and regulating the flow of air through said relief pipe.

2. In a dust collecting and separating system, the combination with a supply unit, of a centrifugal dust collector for receiving a stream of dust laden air from said supply unit and separating the bulk of the material therefrom, tubular fabric filtering means communicating at one end with the upper end of said collector to receive and filter the residual material from the air passing from said collector, and means for relieving the internal pressure upon said fabric filtering means comprising a relief pipe communicating with the opposite end thereof and with said supply unit, and an adjustable valve for cutting off and regulating the flow of air through said relief pipe.

3. In a dust collecting and separating system, the combination with a supply unit, of a centrifugal dust collector for receiving a stream of dust laden air from said supply unit and separating the bulk of the material therefrom, an air chamber above and spaced from said collector, tubular fabric filtering means interposed in the space between said collector and said chamber and having opposite open ends communicating respectively therewith, and a relief pipe connecting said air chamber to said supply unit.

4. In a dust collecting and separating system, the combination with a supply unit, of a centrifugal dust collector for receiving a stream of dust laden air from said supply unit and separating the bulk of the material therefrom, an air chamber above and spaced from said collector, a plurality of fabric filtering tubes interposed in the space between said collector and said air chamber and having open lower and upper ends communicating respectively therewith, a relief pipe connecting said air chamber to said supply unit and an adjustable valve for cutting off and controlling the flow of air through said pipe.

5. In a dust collecting and separating system, the combination with a supply unit, of a centrifugal collecting chamber for receiving dust-laden air from said supply unit and separating the bulk of the material therefrom, said collector having a plurality of air outlets in its upper end, an air chamber above said collecting chamber and having a plurality of openings in its lower wall, a plurality of vertically disposed fabric filtering tubes interposed between said air outlets and the openings of said air chamber for separating the remaining material, and a relief pipe leading from said chamber to said supply unit, said relief pipe having a valve for controlling the flow of air therethrough and through said filtering tubes.

6. In a dust collecting and separating system, the combination with a supply unit, of a centrifugal collecting chamber for receiving dust-laden air from said supply unit and separating the bulk of the material therefrom, said collector having a plurality of air outlets in its top wall, an air chamber above said collecting chamber and having a plurality of openings in its bottom wall, a plurality of vertically disposed fabric filtering tubes interposed between said air outlets and the opening of said air chamber for separating the remaining material, and a relief pipe leading from said chamber to said supply unit, said collector having a flaring guard in its upper portion for projecting said air outlets and deflecting material returned to said collector from said filtering tubes.

7. A combined dust collector and separator comprising a centrifugal collecting chamber having an upper cylindrical portion and a lower conical portion, said chamber being provided with a tangential air inlet opening into its upper cylindrical portion, a plurality of air outlets in its top wall and a discharge outlet for material at the lower end of its conical portion, a plurality of fabric filtering tubes communicating with said air outlets for separating the fine residual material from the air passing therethrough, and a concentric flaring guard of inverted bell-shape arranged substantially entirely within the upper cylindrical portion of said chamber and having longitudinally curved walls extending inwardly from a point adjacent but spaced from the top wall and thence downwardly to a point below the tangential air inlet, substantially as described.

8. In a dust collecting and separating system, the combination with a supply unit, of a centrifugal collecting chamber for receiving dust-laden air from said supply unit and separating the bulk of the material therefrom, said collector having a plurality of air outlets in its upper end, an air chamber above said collecting chamber and having a plurality of openings in its lower wall, a plurality of vertically disposed fabric filtering tubes interposed between said air outlets and the openings of said air chamber for separating the remaining material, and a relief pipe leading from said chamber to said supply unit.

EDMUND H. STROUD.